United States Patent
Shankar et al.

(10) Patent No.: US 8,417,257 B2
(45) Date of Patent: Apr. 9, 2013

(54) METHOD AND SYSTEM FOR LOAD BALANCING TRAFFIC IN A WIRELESS NETWORK

(75) Inventors: Rohit Shankar, Hyderabad (IN); Swati Shukla, Secunderabad (IN); Sumit B. Deshpande, Central Islip, NY (US); Muralidhar Swarangi, Visakhapatnam (IN)

(73) Assignee: CA, Inc., Islandia, NY (US)

( * ) Notice: Subject to any disclaimer, the term of this patent is extended or adjusted under 35 U.S.C. 154(b) by 798 days.

(21) Appl. No.: 11/466,264

(22) Filed: Aug. 22, 2006

(65) Prior Publication Data

US 2008/0049687 A1    Feb. 28, 2008

(51) Int. Cl.
*H04W 72/00* (2009.01)

(52) U.S. Cl.
USPC .......... 455/453; 455/513; 455/424; 455/439; 455/67.11; 455/455; 370/329; 370/338; 370/230.1

(58) Field of Classification Search ................ None
See application file for complete search history.

(56) References Cited

U.S. PATENT DOCUMENTS

| | | | |
|---|---|---|---|
| 5,539,883 A * | 7/1996 | Allon et al. | 718/105 |
| 6,671,512 B2 * | 12/2003 | Laakso | 455/453 |
| 6,965,942 B1 | 11/2005 | Young et al. | |
| 6,990,116 B1 | 1/2006 | Young et al. | |
| 7,440,573 B2 * | 10/2008 | Lor et al. | 380/270 |
| 7,529,203 B2 * | 5/2009 | Bajic et al. | 370/328 |
| 2002/0035699 A1 | 3/2002 | Crosbie | |
| 2003/0169713 A1 | 9/2003 | Luo | |
| 2004/0090943 A1 | 5/2004 | da Costa et al. | |
| 2005/0174943 A1 | 8/2005 | Wang | |
| 2006/0146768 A1 | 7/2006 | Bejerano et al. | |
| 2008/0031212 A1 * | 2/2008 | Ogura | 370/338 |

* cited by examiner

*Primary Examiner* — Willie J Daniel, Jr.
(74) *Attorney, Agent, or Firm* — Baker Botts, L.L.P.

(57) ABSTRACT

According to one embodiment of the invention, a method for load balancing traffic in a wireless network includes identifying a respective operational parameter from wireless network devices in the wireless network. The respective operational parameter indicates a number of endpoint associations for the wireless network devices. The method also includes detecting a wireless network device with a particular number of endpoint associations by examining each of the respective operational parameters. The method further includes, in response to the detected wireless network device, configuring the wireless network device to limit the number of endpoint associations to a number less than the particular number.

11 Claims, 2 Drawing Sheets

METHOD AND SYSTEM FOR LOAD BALANCING TRAFFIC IN A WIRELESS NETWORK

TECHNICAL FIELD OF THE INVENTION

This invention relates generally to wireless networks, and more particularly, to a method and system for load balancing traffic in a wireless network.

BACKGROUND OF THE INVENTION

Endpoint devices, such as laptops, may communicate with a wireless network through wireless network devices, such as access points. As the wireless network grows in size and complexity, the augmentation of endpoint devices and wireless network devices may cause an increase in traffic. When a wireless network device receives a high volume of traffic, the wireless network device may choose to service traffic requests one at a time. Requests that are not being processed typically wait until the wireless network device is ready to receive more requests. As a result, the wireless network device can become a bottleneck in the wireless network.

OVERVIEW OF EXAMPLE EMBODIMENTS

According to one embodiment of the invention, a method for load balancing traffic in a wireless network includes identifying a respective operational parameter from wireless network devices in the wireless network. The respective operational parameter indicates a number of endpoint associations for the wireless network devices. The method also includes detecting a wireless network device with a particular number of endpoint associations by examining each of the respective operational parameters. The method further includes, in response to the detected wireless network device, configuring the wireless network device to limit the number of endpoint associations to a number less than the particular number.

Technical advantages of particular embodiments of the present invention include a method and system for load balancing traffic in a wireless network that detects wireless network devices that are overloaded with traffic. Thus, traffic may be evenly distributed among wireless network devices.

Another technical advantage of particular embodiments of the present invention includes a method and system for load balancing traffic in a wireless network that limits the number of endpoint associations for a wireless network device. Therefore, in periods of high traffic, wireless network devices share the traffic load by accepting a limited number of endpoint associations at each wireless network device.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 3:
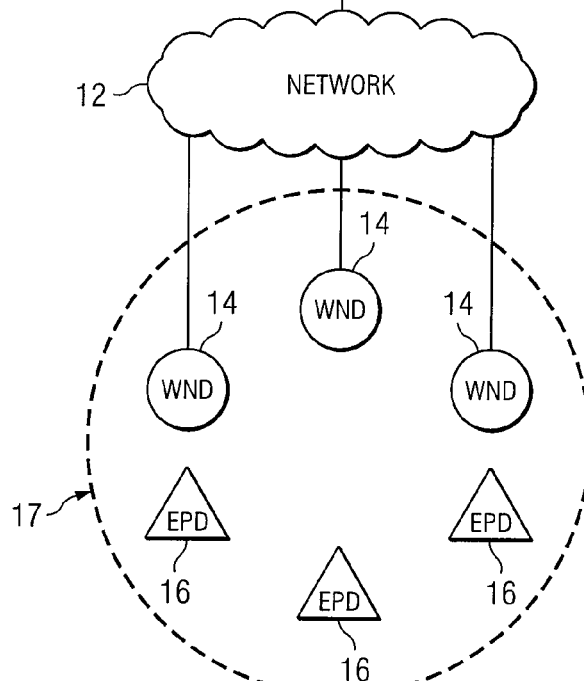
FIG. 3 is a flow chart illustrating example acts associated with a method for load balancing traffic in a wireless network.
Figure 3:
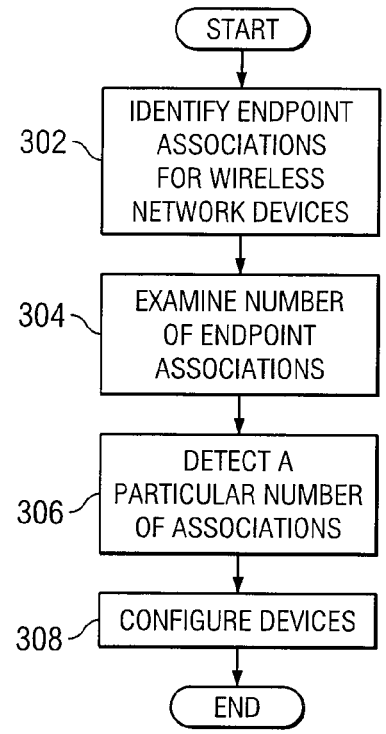

Embodiments of the present invention and its advantages are best understood by referring to FIGS. 1 through 3 of the drawings, like numerals being used for like and corresponding parts of the various drawings.

Figure 1A:
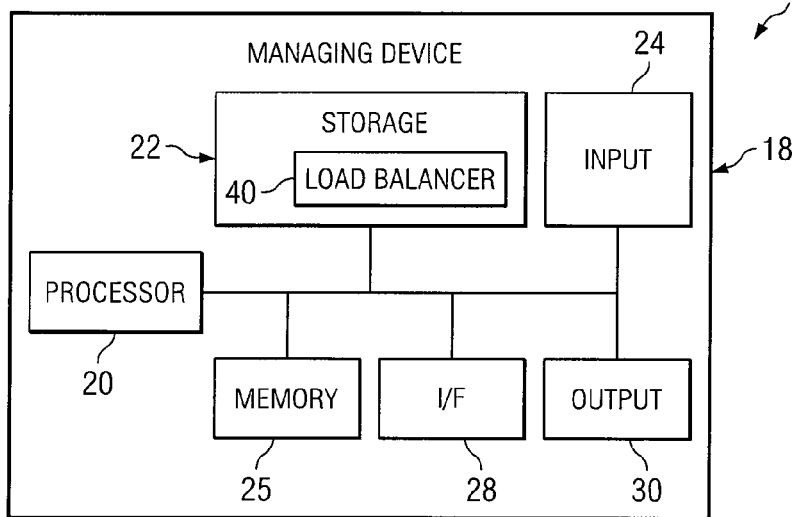
FIG. 1A is a block diagram illustrating a system for load balancing traffic in a wireless network according to the teachings of the invention.

FIG. 1A is a block diagram illustrating a system 10 for load balancing traffic in a wireless network according to the teachings of the invention. As shown in FIG. 1A, system 10 generally includes a network 12, one or more wireless network devices 14, one or more endpoint devices 16, a wireless network range 17, and a managing device 18. System 10 is particularly adapted for balancing wireless network traffic among wireless network devices in a wireless network.

Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 12 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Network 12 may utilize communication protocols and technologies to transmit packet flows. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards. As an example, network 12 may utilize the IEEE 802.xx standards such as the 802.11 standards.

Wireless network device 14 may be any network point suitable to couple an endpoint device, such as endpoint device 16, to a network, such as network 12. Wireless network device 14 may be, for example, a session border controller, gatekeeper, call manager, conference bridge, router, hub, switch, gateway, access point, edge point, or any other hardware or software operable to couple an endpoint device, such as endpoint device 16, to a network.

According to one embodiment of the invention, wireless network device 14 may have a wired connection to network 12. According to another embodiment of the invention, wireless network device 14 may have a wireless connection to network 12. According to yet another embodiment of the invention, wireless network device 14 may include a receiver or transmitter or both a receiver and a transmitter. As an example, wireless network device 14 may include an omni directional antenna operable to communicate with one or more endpoint devices.

Endpoint device 16 may refer to any suitable device operable to communicate with network 12 through a wireless network device 14. Endpoint device 16 may execute with any of the well-known MS-DOS, PC-DOS, OS-2, MAC-OS, WINDOWS™, UNIX, or other appropriate operating systems, including future operating systems. Endpoint device 16 may include, for example, a personal digital assistant, a computer such as a laptop, a cellular telephone, a mobile handset, or any other device operable to communicate with network 12 through wireless network device 14.

Wireless network range 17 may refer to any suitable signal range for communications between wireless network device 14 and endpoint device 16. In particular embodiments of the invention, communications between wireless network device 14 and endpoint device 16 are communicated in wireless network range 17 according to one or more secure wireless communication protocols or WLAN protocols, such as portions or all of the Wired Equivalent Privacy (WEP) protocol, the Robust Security Network (RSN) associated with the IEEE 802.11i protocol, the IEEE 802.1x protocol, the Advanced Encryption Standard (AES), the Temporal Key Integrity Protocol (TKIP), Extensible Authentication Protocol over LAN (EAPOL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

Managing device 18 represents any device suitable to balance the traffic among wireless network devices, such as wireless network device 14, in a wireless network. Although FIG. 1A provides one example of managing device 18 as operating within network 12, in other embodiments managing device 18 may operate as a wireless device connecting to network 12 through a wireless network device 14. Additional details of one example of managing device 18 are described in more detail below.

In various embodiments of the invention, a wireless network may have endpoint devices, such as endpoint device 16, communicating with a network through wireless network devices, such as wireless network device 14. As the network grows in size, the augmentation of endpoint devices may cause an increase in traffic. As a result, some wireless network devices may become overloaded with traffic, while other wireless network devices may remain partially loaded. As a result, the overloaded wireless network devices may become a bottleneck in the wireless network.

According to one embodiment of the invention, a system and method are provided that balance traffic among wireless network devices, such as wireless network device 14, in a wireless network. This is effected by detecting wireless network devices that are overloaded with traffic. Balancing traffic, by a managing device, evenly distributes endpoint associations among wireless network devices. Additional details of example embodiments of the invention are described in greater detail below in conjunction with portions of FIG. 1A, FIG. 1B, FIG. 2A, FIG. 2B, and FIG. 3.

According to the illustrated embodiment of the invention, managing device 18 includes a processor 20, a storage device 22, an input device 24, a memory device 26, a communication interface 28, an output device 30, and a channel allocation manager 40.

Processor 20 may refer to any suitable device operable to execute instructions and manipulate data to perform operations for managing device 18. Processor 20 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for managing device 18, send output from managing device 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows managing device 18 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Load balancer 40 may refer to any suitable logic embodied in computer-readable media, and when executed operable to balance traffic among wireless network devices. In the illustrated embodiment of the invention, load balancer 40 resides in storage device 22. In other embodiments of the invention, load balancer 40 may reside in memory device 26, or any other suitable device operable to store and facilitate retrieval of data and instructions.

Figure 1B:
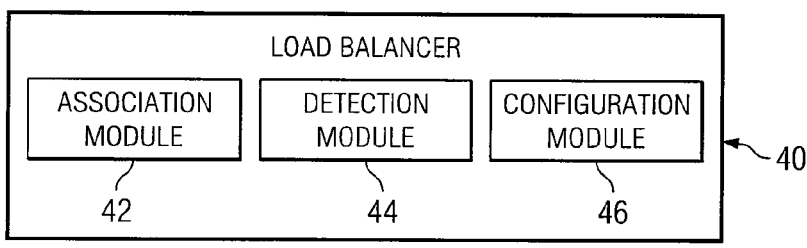
FIG. 1B is a block diagram illustrating an example load balancer of the system of FIG. 1A in accordance with an embodiment of the present invention.

FIG. 1B is a block diagram illustrating an example load balancer 40 of system 10 of FIG. 1A in accordance with an embodiment of the present invention. Load balancer 40 may include various modules operable to perform various functions including an association module 42, a detection module 44, and a configuration module 46.

According to one embodiment of the invention, association module 42 may identify operational parameters from wireless network device 14. The operational parameters may include a parameter indicative of endpoint associations for wireless network 14. For example, association module 42 may identify that wireless network device 14 has four endpoint associations. In various embodiments of the invention, the parameter indicative of endpoint associations may refer to a percentage of endpoint associations for wireless network device 14. For example, association module 42 may identify that wireless network device 14 is associated with 75% of the endpoint devices in the wireless network. However, the present disclosure contemplates many types of operational parameters indicative of the number of endpoint associations for wireless network device 14. Various embodiments may include some, all, or none of the enumerated operational parameters.

According to one embodiment of the invention, detection module 44 may examine each of the respective operational parameters from the wireless network devices and detect whether wireless network device 14 has a particular number of endpoint associations. For example, a particular number of endpoint associations in the wireless network may be set to a maximum number. The maximum number may be, for example, eight endpoint associations for wireless network device 14. By examining the operational parameter indicative of endpoint associations for wireless network device 14, detection module 44 may detect that wireless network device 14 is overloaded with endpoint associations. However, the present disclosure contemplates many types of strategies for examining and detecting a particular number of endpoint associations at wireless network device 14. Various embodiments may include some, all, or none of the enumerated strategies.

According to one embodiment of the invention, detection module 44 may generate an overloaded list including one or more wireless network devices in the wireless network with a maximum number of endpoint associations. For example, detection module 44 may add wireless network device 14 to the overloaded wireless network device list if wireless network device 14 has a maximum number of endpoint associations, such as ten endpoint associations out of a possible ten endpoint associations.

According to one embodiment of the invention, detection module 44 may generate a partially loaded list including one or more wireless network devices in the wireless network with a minimal number of endpoint associations. For example, detection module 44 may add wireless network device 14 to the partially loaded wireless network device list if wireless network device 14 has a minimal number of endpoint associations, such as two endpoint associations out of a possible ten endpoint associations.

According to one embodiment of the invention, detection module 44 may detect an endpoint device, such as endpoint device 16, from a wireless network device, such as wireless network device 14, listed on the overloaded wireless network device list. For example, detection module 44 may detect, at random, endpoint device 16 from the endpoint associations for wireless network device 14. As another example, detection module 44 may detect that endpoint device 16 is associated to wireless network device 14, and in range of other wireless network devices.

According to one embodiment of the invention, configuration module 46 may distribute a command to endpoint device 16 to disassociate from wireless network device 14 located on the overloaded wireless network device list. For example, wireless network device 14 may be located on the overloaded wireless network device list if wireless network device 14 has a maximum number of endpoint associations, such as ten endpoint associations out of a possible ten endpoint associations. Configuration module 46 may distribute a command to an endpoint device 16 to disassociate with wireless network device 14 to reduce the traffic load on wireless network device 14.

According to one embodiment of the invention, configuration module 46 may distribute a command to endpoint device 16 to associate with wireless network device 14 located on the partially loaded wireless network device list. For example, wireless network device 14 may be located on the partially loaded wireless network device list if wireless network device 14 has a minimal number of endpoint associations, such as two endpoint associations out of a possible ten endpoint associations. Configuration module 46 may distribute a command to an endpoint device 16 to associate with wireless network device 14 to increase the traffic load on wireless network device 14.

According to one embodiment of the invention, configuration module 46 may limit the number of endpoint associations at wireless network device 14 to a number less than a particular number. For example, configuration module 46 may specify a number of endpoint associations at wireless network device 14. By specifying a number of endpoint associations at wireless network device 14, endpoint devices, such as endpoint device 16, are forced to average the load among other wireless network devices in the wireless network.

According to one embodiment of the invention, the wireless network devices managed by load balancer 40 may be managed by agents on the devices. An agent may be any suitable logic operable to report to load balancer 40 through managing device 18 upon command, and possibly on a regular basis. Load balancer 40 may then balance traffic among wireless network devices through a customizable agent on the wireless network devices. In other embodiments, load balancer 40 may communicate with the wireless network devices using other protocols such as Simple Network Management Protocol (SNMP), thereby allowing third-party software agents and hardware devices to be managed.

Figure 2A:
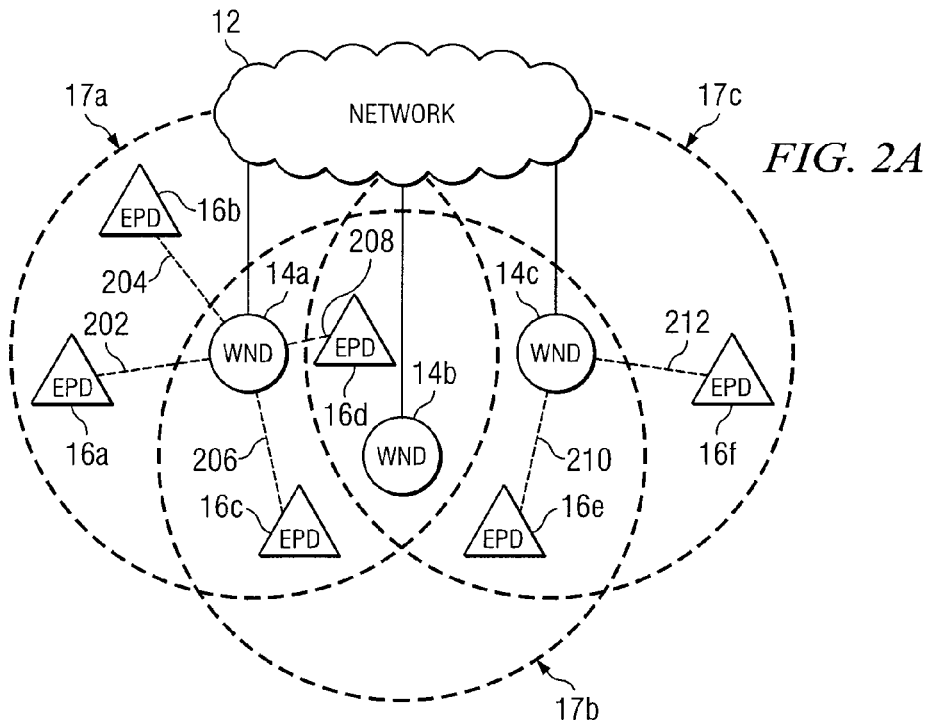
FIG. 2A is a block diagram illustrating example endpoint associations of the system of FIG. 1A, according to an embodiment of the invention.

FIG. 2A is a block diagram illustrating example endpoint associations of system 10 of FIG. 1A, according to an embodiment of the invention. As shown in FIG. 2A, wireless network devices 14a, 14b, and 14c are connected to a network 12. Wireless network devices 14a, 14b, and 14c may be substantially similar to wireless network device 14 of FIG. 1A. Wireless network devices 14a, 14b, and 14c each have wireless network ranges 17a, 17b, and 17c, respectively. Wireless network ranges 17a, 17b, and 17c may be substantially similar to wireless network range 17 of FIG. 1A.

As shown in FIG. 2A, wireless network device 14a has endpoint associations with endpoint devices 16a, 16b, 16c, and 16d, as indicated by reference numbers 202, 204, 206, and 208. Wireless network device 14c has endpoint associations with endpoint devices 16e and 16f, as indicated by reference numbers 210 and 212. Thus, wireless network device 14a has a higher load of endpoint associations than wireless network device 14b and 14c.

According to one embodiment of the invention, the traffic load at wireless network device 14a may be detected using operational parameters from wireless network device 14a. The operational parameters may include a parameter indicative of endpoint associations for wireless network 14a. For example, an operational parameter indicating four endpoint associations may be detected from wireless network device 14a.

According to one embodiment of the invention, the wireless network device 14a may be configured to evenly distribute the load among other wireless network devices. For example, the number of endpoint associations at wireless network device 14a may be limited to a maximum of two endpoint associations. By specifying a maximum number of endpoint associations at wireless network device 14, endpoint devices, such as endpoint device 16, are forced to average the load among other wireless network devices in the wireless network.

Figure 2B:
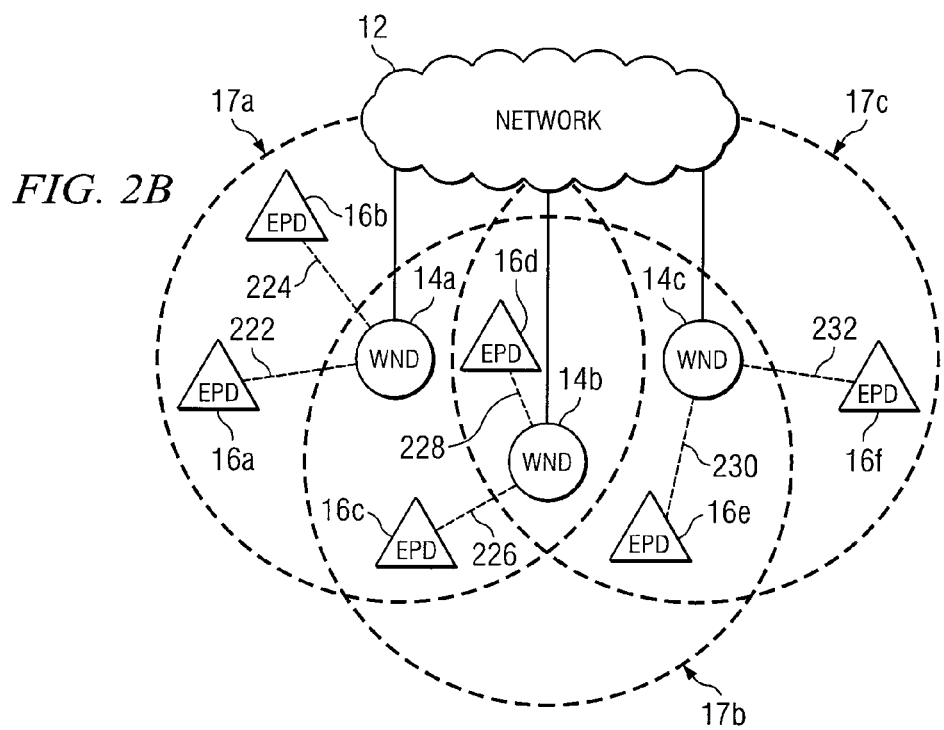
FIG. 2B is a block diagram illustrating example endpoint associations of the system of FIG. 1A, according to another embodiment of the invention.

According to one embodiment of the invention, endpoint devices 16c and 16d may receive a command to disassociate from wireless network device 14a, and associate with wireless network device 14b as shown in FIG. 2B. After balancing the load, wireless network device 14a may have endpoint associations with endpoint device 16a and 16b, as indicated by reference numbers 222 and 224. Wireless network device 14b may have endpoint associations with endpoint device 16c and 16d, as indicated by reference numbers 226 and 228. Wireless network device 14c may have endpoint associations with endpoint device 16e and 16f, as indicated by reference numbers 230 and 232.

FIG. 3 is a flow chart illustrating example acts associated with a method for load balancing traffic in a wireless network. The example acts may be performed by load balancer 40 as discussed above with reference to FIGS. 1A and 1B. At step 302 operational parameters of wireless network devices may be identified. The operational parameters may include a parameter indicative of a number of endpoint associations for the wireless network devices. For example, a parameter indicative of a number of endpoint associations, such as four endpoint associations, may be identified at a wireless network device.

At step 304 the number of endpoint associations for each wireless network device is examined. The number of endpoint associations for each wireless network device may be examined to detect whether each wireless network device has a particular number of endpoint associations. For example, a particular number of endpoint associations in the wireless network may be set to a maximum number. The maximum number may be, for example, eight endpoint associations. By examining the operational parameter indicative of endpoint associations, a wireless network device overloaded with endpoint associations may be detected at step 306.

At step 308 the detected wireless network device is configured by the load balancing managing system. For example, the number of endpoint associations at the wireless network device may be limited to a maximum of two endpoint associations. By specifying a maximum number of endpoint associations at the wireless network device, endpoint devices are forced to average the load among other wireless network devices in the wireless network. According to another embodiment, endpoint devices may receive a command to disassociate from the wireless network device and associate with another wireless network device to balance the load among wireless network devices. Balancing the load among wireless network devices may reduce bottlenecks in the wireless network.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for load balancing traffic in a wireless network, comprising:

identifying, by a managing device, a respective operational parameter from each of a plurality of wireless network devices in the wireless network, the respective operational parameter indicative of a number of endpoint associations for each of the plurality of wireless network devices;

identifying a maximum number of endpoint associations supported for each of the plurality of wireless network devices;

examining, by the managing device, each of the respective operational parameters to generate an overloaded wireless network device list and a partially loaded wireless network device list, the overloaded wireless network device list comprising one or more wireless network devices with the maximum number of endpoint associations, the partially loaded wireless network device list comprising one or more wireless network devices with less than the maximum number of endpoint associations;

identifying, by the managing device, a wireless network device from the overloaded wireless network device list;

distributing, by the managing device, a first command to an endpoint device to disassociate from the identified wireless network device and a second command to the endpoint device to associate with a wireless network device of the one or more wireless network devices from the partially loaded wireless network device list; and configuring, by the managing device, the identified wireless network device to limit the number of endpoint associations that are allowed to be wirelessly associated with the identified wireless network device by preventing additional endpoint devices from wirelessly associating with the identified wireless network device while the number of endpoint associations of the identified wireless network device is at least a particular number, wherein the particular number is less than the maximum number.

2. A method for load balancing traffic in a wireless network, comprising: identifying, by a managing device, a respective operational parameter from each of a plurality of wireless network devices in the wireless network, the respective operational parameter indicative of a number of endpoint associations for each of the plurality of wireless network devices; identifying a maximum number of endpoint associations supported for each of the plurality of wireless network devices; detecting, by the managing device, a wireless network device with at least a particular number of endpoint associations by examining each of the respective operational parameters; and in response to the detected wireless network device, configuring, by the managing device, the detected wireless network device to limit the number of endpoint associations that are allowed to be wirelessly associated with the detected wireless network device by preventing additional endpoint devices from wirelessly associating with the detected wireless network device while the number of endpoint associations of the detected wireless network device is at least the particular number, wherein detecting, by the managing device, a wireless network device with at least a particular number of endpoint associations by examining each of the respective operational parameters further comprises generating, by the managing device, an overloaded wireless network device list, wherein the overloaded wireless network device list comprises one or more wireless network devices in the wireless network with a maximum number of endpoint associations, and wherein detecting, by the managing device, a wireless network device with at least a particular number of endpoint associations by examining each of the respective operational parameters further comprises generating, by the managing device, a partially loaded wireless network device list, wherein the partially loaded wireless network device list comprises one or more wireless network devices in the wireless network with a minimal number of endpoint associations.

3. The method of claim 2, wherein configuring, by the managing device, the detected wireless network device to limit the number of endpoint associations that are allowed to be wirelessly associated with the detected wireless network device further comprises specifying, by the managing device, a maximum number of endpoint associations at the detected wireless network device.

4. The method of claim 2, further comprising distributing, by the managing device, a command to an endpoint device of the detected wireless network device to disassociate from the detected wireless network device.

5. The method of claim 2, further comprising distributing, by the managing device, a command to an endpoint device of the detected wireless network device to associate with a new wireless network device of the plurality of wireless network devices.

6. A system for load balancing traffic in a wireless network, comprising:
- a wireless network, the wireless network comprising one or more devices; and
- a managing device operable to connect to the wireless network, the managing device comprising:
  - a processor; and
  - a storage device readable by the managing device, embodying a program of instructions executable by the processor to perform acts for load balancing traffic in a wireless network, the acts comprising:
    - identifying a respective operational parameter from each of a plurality of wireless network devices in the wireless network, the respective operational parameter indicative of a number of endpoint associations for each of the plurality of wireless network devices;
    - identifying a maximum number of endpoint associations supported for each of the plurality of wireless network devices;
    - detecting a wireless network device with at least a particular number of endpoint associations by examining each of the respective operational parameters; and
    - in response to the detected wireless network device, configuring the detected wireless network device to limit the number of endpoint associations that are allowed to be wirelessly associated with the detected wireless network device by preventing additional endpoint devices from wirelessly associating with the detected wireless network device while the number of endpoint associations of the detected wireless network device is at least the particular number, wherein the act of detecting a wireless network device with at least a particular number of endpoint associations by examining each of the respective operational parameters further comprises the act of generating an overloaded wireless network device list, wherein the overloaded wireless network device list comprises one or more wireless network devices in the wireless network with a maximum number of endpoint associations, and wherein detecting a wireless network device with at least a particular number of endpoint associations by examining each of the respective operational parameters further comprises the act of generating a partially loaded wireless network device list, wherein the partially loaded wireless network device list comprises one or more wireless network devices in the wireless network with a minimal number of endpoint associations.

7. The system of claim 6, further comprising the act of distributing a command to an endpoint device of the detected wireless network device to disassociate from the detected wireless network device.

8. The system of claim 6, further comprising the act of distributing a command to an endpoint device of the detected wireless network device to associate with a new wireless network device of the plurality of wireless network devices.

9. A tangible computer readable media encoded with logic, the logic configured to, when executed by a processor:
- identify, by a managing device, a respective operational parameter from each of a plurality of wireless network devices in the wireless network, the respective operational parameter indicative of a number of endpoint associations for each of the plurality of wireless network devices;
- identify a maximum number of endpoint associations supported for each of the plurality of wireless network devices;
- detect, by the managing device, a wireless network device with at least a particular number of endpoint associations by examining each of the respective operational parameters; and
- in response to the detected wireless network device, configure, by the managing device, the detected wireless network device to limit the number of endpoint associations that are allowed to be wirelessly associated with the detected wireless network device by preventing additional endpoint devices from wirelessly associating with the detected wireless network device while the number of endpoint associations of the detected wireless network device is at least the particular number, wherein the logic configured to detect, by the managing device, a wireless network device with at least a particular number of endpoint associations by examining each of the respective operational parameters is further configured to generate, by the managing device, an overloaded wireless network device list, wherein the overloaded wireless network device list comprises one or more wireless network devices in the wireless network with a maximum number of endpoint associations, and wherein the logic configured to detect, by the managing device, a wireless network device with at least a particular number of endpoint associations by examining each of the respective operational parameters is further configured to generate, by the managing device, a partially loaded wireless network device list, wherein the partially loaded wireless network device list comprises one or more wireless network devices in the wireless network with a minimal number of endpoint associations.

10. The tangible computer readable media of claim 9, wherein the logic is further configured to distribute, by the managing device, a command to an endpoint device of the detected wireless network device to disassociate from the detected wireless network device.

11. The tangible computer readable media of claim 9, wherein the logic is further configured to distribute, by the managing device, a command to an endpoint device of the detected wireless network device to associate with a new wireless network device of the plurality of wireless network devices.

* * * * *